April 3, 1934. F. FRASER 1,953,344
PROCESS AND APPARATUS FOR SEALING LAMINATED GLASS
Filed Feb. 21, 1930 3 Sheets-Sheet 1
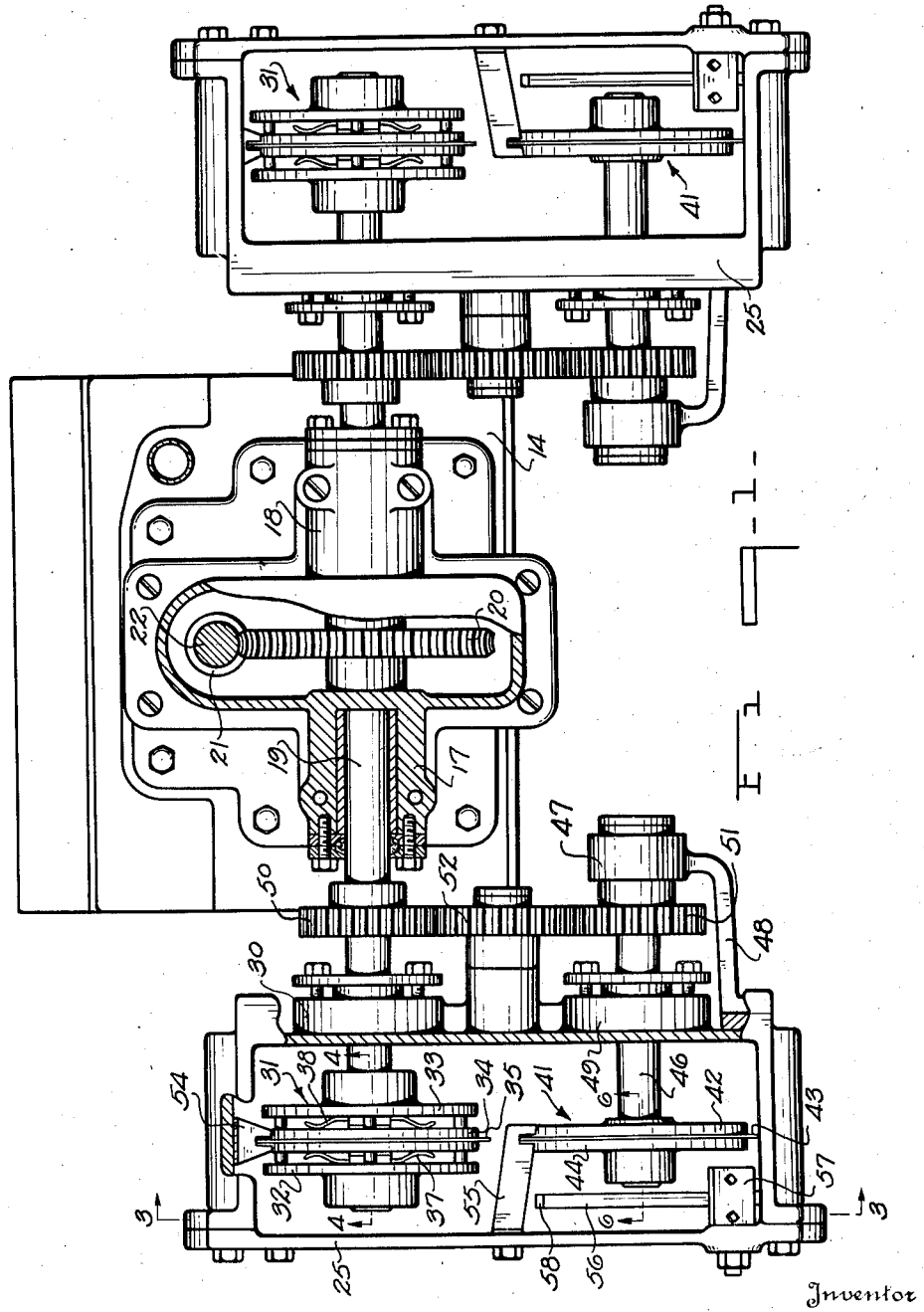
Inventor
Frank Fraser

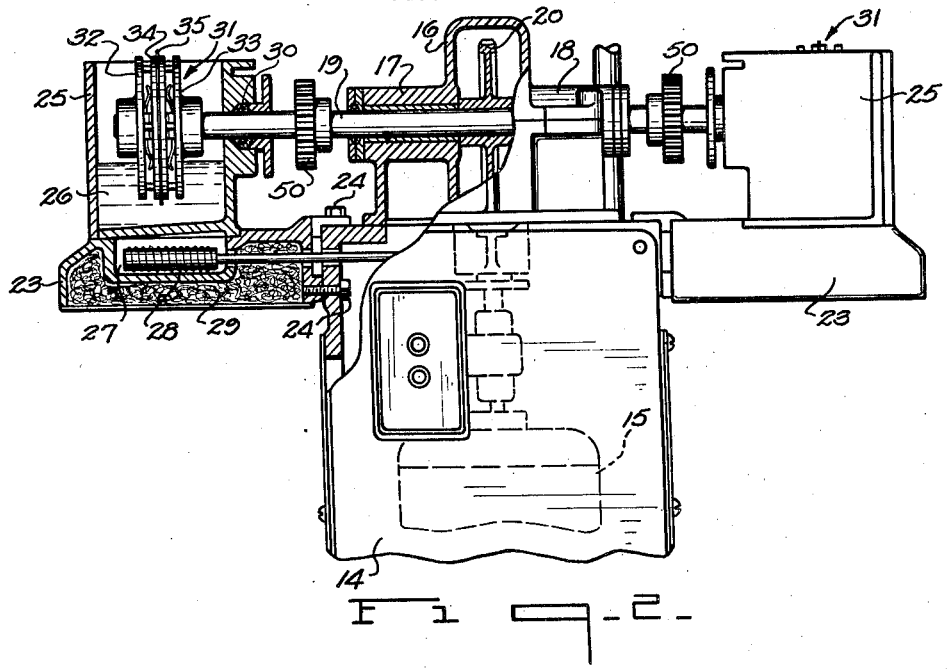
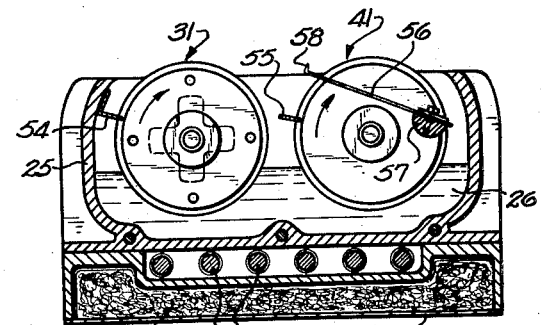
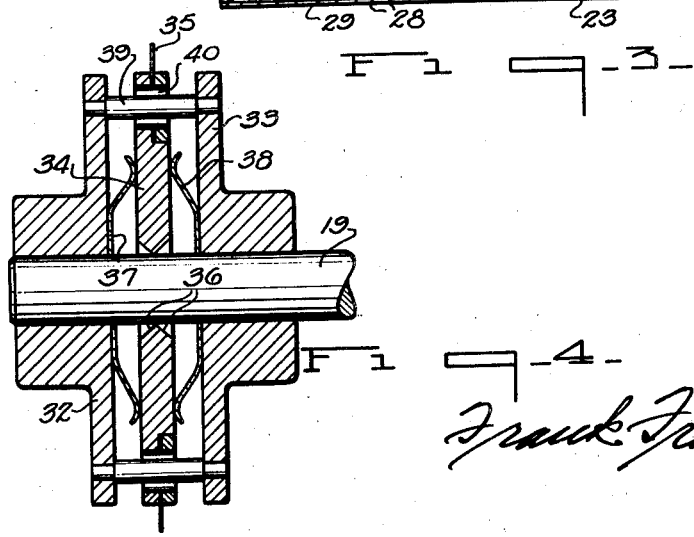

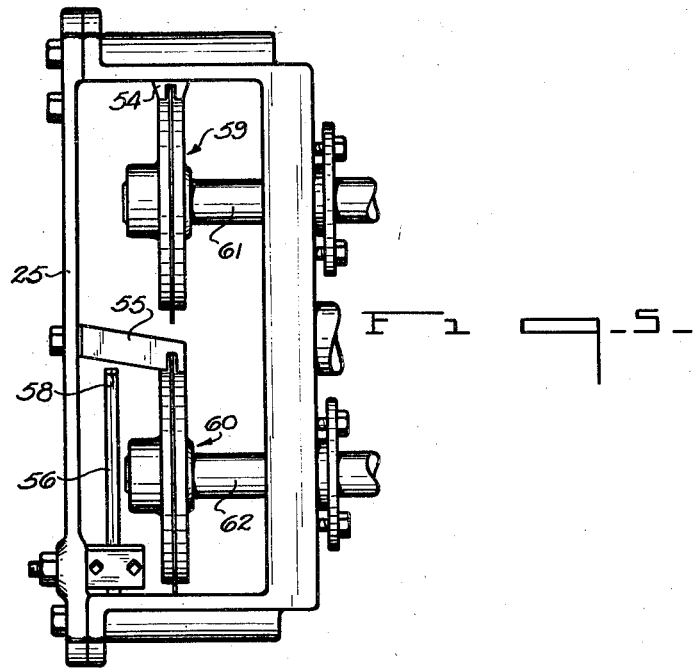
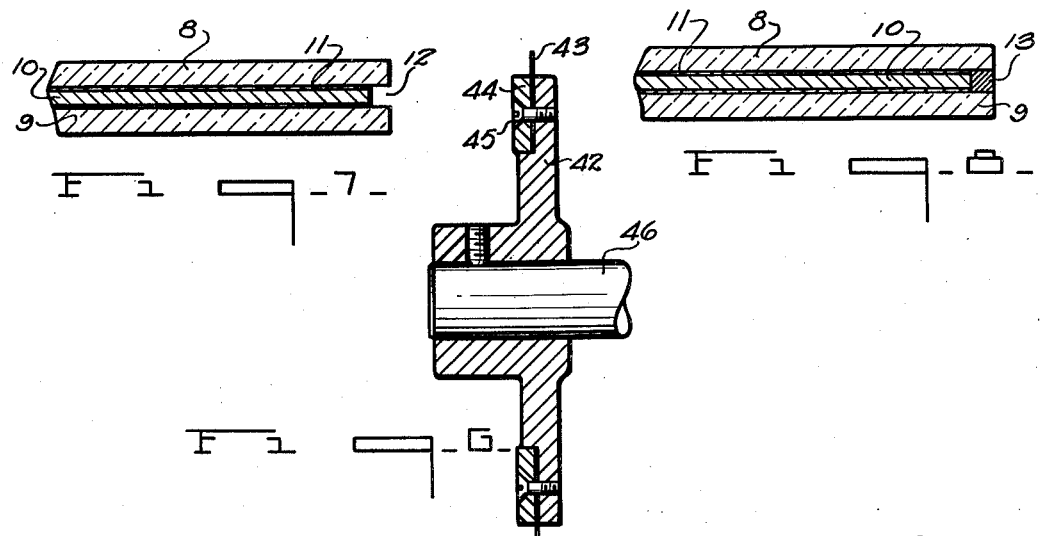

Patented Apr. 3, 1934

UNITED STATES PATENT OFFICE 1,953,344

1,953,344
PROCESS AND APPARATUS FOR SEALING LAMINATED GLASS

Frank Fraser, Toledo, Ohio, assignor to Libbey-Owens-Ford Glass Company, Toledo, Ohio, a corporation of Ohio Application February 21, 1930, Serial No. 430,255

14 Claims. (Cl. 49—81)

The present invention relates to the manufacture of laminated sheet glass and particularly to an improved process and apparatus for effecting the sealing of the edges thereof.

In the manufacture of laminated sheet glass, it is customary to unite two or more sheets of glass and one or more sheets of non-brittle material to form a composite structure, one sheet of non-brittle material being ordinarily interposed between and bonded to two sheets of glass. To protect the non-brittle portion and the bond between the laminations from the atmosphere, the practice of sealing the edges of the laminated sheet is sometimes followed. This sealing may be accomplished by first providing a continuous channel or groove around the edges of the laminated sheet between the adjacent sheets of glass and then filling in this channel or groove with a suitable sealing material.

The general object of the present invention is the provision of a process and apparatus for facilitating and improving generally the sealing of laminated glass to the end that a seal may be provided which will properly protect the bond between the several sheets or laminations from the atmosphere, etc.

Another important object of the invention is the provision of a process and apparatus of the above character, by the practice and use of which the sealing of the laminated sheets can be accomplished more rapidly and efficiently than heretofore and in an easy and convenient manner with a minimum amount of breakage.

Another object of the invention is the provision of such a process and apparatus wherein the laminated sheet to be sealed is subjected first to a preliminary sealing operation and then to a final sealing operation while said sheet is being continuously moved forwardly in a single direction.

A further object is the provision of such a process and apparatus wherein the laminated sheet is sealed by the passage thereof in a single forward stroke or movement of the operator over and into operative relation with respect to a plurality of sealing elements.

Still another object is the provision of a sealing apparatus or machine of the above character wherein a plurality of working or sealing tools are mounted in substantial alignment with one another, the sheet to be sealed being passed successively into operative relation with respect to said tools which function to feed the sealing material into place within the channel or groove thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of a sealing machine constructed in accordance with the present invention and shown partially broken away, Fig. 2 is a front elevation thereof, partially in section, Fig. 3 is a section taken substantially on line 3—3 of Fig. 1, Fig. 4 is a section taken substantially on line 4—4 of Fig. 1, Fig. 5 is a plan view of a slightly modified arrangement, Fig. 6 is a section taken substantially on line 6—6 of Fig. 1, Fig. 7 is a sectional view of a sheet of laminated glass, prior to sealing, and Fig. 8 is a similar view, subsequent to sealing.

Briefly stated, according to this invention, the sealing or luting of the edges of the laminated sheet is effected by the use of a pair of sealing tools preferably in the form of wheels or disc-like elements arranged in substantially horizontal alignment with one another and rotatable about horizontal axes, the lower portions of their peripheries being immersed within a suitable sealing material or liquid. The sheet to be sealed is then held in a substantially vertical position and moved along into successive operative relation with respect to the upper portions of the peripheries of the tools, said tools being adapted, upon rotation, to pick up the sealing material or liquid and feed it into place in the sheet edge. The first wheel with which the sheet comes into operative relation serves to effect a preliminary sealing of the sheet and the second wheel the final sealing thereof. It has been found that by providing two sealing wheels of this nature, the sheet can be sealed in a more rapid and efficient manner than heretofore and with a single forward stroke or movement of the operator which carries the sheets continuously forwardly into successive operative relation with respect to said wheels.

As shown in Fig. 7, laminated sheet glass ordinarily consists of two sheets of preferably transparent glass 8 and 9, between which is interposed a sheet or membrane 10 of some suitable non-brittle material joined or bonded to the glass sheets by any suitable solvent, adhesive or the like 11, whereby to create a composite structure. The surfaces of the glass sheets may or may not be ground and polished, as desired, and it is to be understood that the present invention is not restricted to any particular type of laminated glass, the materials used in its structure, or the process of laminating.

The practicability and commercial value of the laminated sheet is dependent largely upon the quality and permanency of the body between the laminations. Therefore, in order to positively protect the bond from the atmosphere, etc., the practice of sealing or luting the edges of the laminated sheet is sometimes followed. This sealing may be accomplished by first providing a continuous channel or groove 12 around the edges of the laminated sheet between the adjacent sheets of glass and in then filling in this channel or groove with a suitable sealing or luting material as indicated at 13 in Fig. 8. The channel or groove 12 may be formed by uniting the glass sheets with a slightly smaller sheet of non-brittle material, or the sheet of non-brittle material may be initially as large as the glass sheets and then subsequently cut back or undercut from the edges of the glass sheets to form the channel or groove.

The machine herein provided and illustrated in the drawings for sealing or luting the sheet edges or, in other words, for applying the sealing material 13 within the channel 12, comprises a vertical supporting housing 14 within which is mounted the prime mover such as the motor 15. Supported upon and secured to the upper end of housing 14 is a head 16 provided with a pair of spaced substantially horizontal bearings 17 and 18 within which is journaled the horizontal operating shaft 19. Keyed upon shaft 19 between bearings 17 and 18 is a worm gear or the like 20 driven from the motor 15 through suitable driving connections including a worm 21 meshing with said worm gear and carried by a shaft 22.

Carried by the housing 14 at each side thereof is a horizontal bracket or support 23 secured to said housing by bolts or other fastening means 24. Supported upon the bracket 23 is a receptacle 25 containing a supply of sealing material or liquid 26. Formed in the upper surface of the support 23 is a recess 27 within which is disposed a plurality of electric heating elements or units 28 which extend transversely beneath the receptacle and are provided to heat up the sealing liquid therein and to maintain the same at a desired, substantially constant and uniform temperature. The support 23 is also preferably hollow and adapted to contain suitable insulating material 29.

The receptacles 25 at opposite sides of the machine are so positioned that the ends of the shaft 19 are received therein adjacent one end thereof. Otherwise stated, the shaft extends through the inner side wall of each receptacle and is surrounded by a packing gland 30. Carried at each end of the shaft 19 and received within the corresponding receptacle 25 is a working or sealing tool or wheel designated in its entirety by the numeral 31. The specific construction of this tool is especially well disclosed in Fig. 4 and it will be noted that the same comprises a pair of spaced annular side members 32 and 33 fixedly secured to shaft 19 and having interposed therebetween and spaced therefrom a disc 34 adjustably mounted upon the shaft so that it is free to rock or wobble and so that it is also capable of bodily sidewise movement. Carried at the periphery of the disc 34 is the sealing element or ring 35.

As shown, the disc 34 is provided with an opening at its center for receiving the shaft 19 therethrough and it will be seen that the wall of this opening is beveled as at 36 so that the disc will have substantially line contact only with shaft 19 whereby to permit the disc to rock or wobble thereupon. In other words, the wall of the opening tapers from the opposite sides of the disc to the center thereof so that said disc is pivoted upon the shaft in a manner to allow a universal rocking movement thereof. The disc 34 is normally held in vertical position by means of the spring members 37 and 38 which are interposed between said disc and the respective side members 32 and 33. However, while normally maintaining the disc in vertical position, the spring members permit a bodily sidewise movement thereof. The disc 34, and consequently the sealing element 35, are driven by means of a plurality of pins 39 which pass transversely through openings 40 in said disc and are carried by the side members 32 and 33. The openings 40 are sufficiently large to permit the desired rocking movement of disc 34. The purpose and advantages of this adjustability of the disc 34 will be more clearly hereinafter apparent.

Also arranged within each receptacle 25 and positioned in substantial horizontal alignment with disc 34 of sealing tool 31 is a second working or sealing tool 41 which may consist, as shown in Fig. 6, of a disc or wheel 42 having an annular reduced portion at the periphery thereof against which is fitted the sealing element or ring 43 removably secured in place by a collar 44 and fastening elements 45. Unlike the sealing wheel 31, the sealing wheel 41 is not adjustably mounted but, on the other hand, is stationary and rotatable about a fixed axis. The disc 42 is keyed to a shaft 46 which projects through the inner side wall of receptacle 25 and is journaled at its outer end in a bearing portion 47 carried by a bracket 48 secured to receptacle 25. The shaft 46 is also surrounded by a packing gland 49 similar to the packing gland 30 surrounding shaft 19.

The sealing wheels 31 and 41 are adapted to be simultaneously driven in the same direction as indicated by the arrows in Fig. 3. The wheel 31 is positively driven upon rotation of the shaft 19 and, in order to drive wheel 41, the shafts 19 and 46 have mounted thereupon gears 50 and 51 respectively which mesh with an intermediate gear 52 so that, upon rotation of shaft 19 to drive wheel 31, rotary movement will be imparted through gears 50, 51 and 52 to drive wheel 41.

In the operation of the machine, a desired amount of sealing material 26 is first placed within the receptacle 25 at each side of the machine and is heated to a desired temperature by means of the electric heating units 28. The sealing liquid is not intended to entirely fill the receptacle but, on the other hand, the amount therein must be sufficient so that the lower portions of the sealing tools 31 and 41 will be immersed therein. The motor 15 is then placed in operation and the driving of shafts 19 and 46 will cause simultaneous rotation of the sealing wheels 31 and 41 in the direction indicated by the arrows in Fig. 3. The laminated sheet is then placed in a vertical position with the edge to be sealed at the bottom or, otherwise stated, facing downwardly. The sheet is then moved horizontally into successive operative relation first with the sealing wheel 31 and then with the sealing wheel 41, said sheet being passed in such relation to said sealing wheels that the sealing elements 35 and 43 thereof will be received within the groove or channel of the sheet to be sealed. As the sheet is moved along over and in operative relation with respect to the sealing wheels, the said wheels will function to pick up the sealing material within the receptacle and carry it upwardly into the groove or channel of the sheet. Thus, the sealing wheel 31 effects a preliminary sealing of the sheet and wheel 41 the final sealing thereof. Otherwise stated, the first wheel will serve to partially fill the groove or channel in the sheet edge with the sealing material while the second wheel will function to completely fill said groove or channel. With such an arrangement, the sheet can be rapidly passed over the two sealing wheels since, in the event the groove is not entirely filled by the first wheel, it will be completely filled by the second wheel. As a matter of fact, the sheet can be passed over the two wheels herein provided more rapidly than over a single wheel since, if only one wheel were used, the sheet would have to be moved relatively more slowly with respect thereto in order to make sure that the groove was completely filled. If the sheet were passed rapidly over a single wheel and it was then found that the groove was not entirely filled, the operator would have to go back and repeat the sealing operation which would naturally consume both additional time and labor and retard production. Consequently, it will be apparent that with the use of two wheels the laminated sheet can be sealed more rapidly and efficiently than with only a single wheel. Although the sheet is herein successively subjected to treatment by two sealing elements, this is accomplished by moving the sheet continuously forwardly in a single forward stroke or movement of the operator so that no additional handling is required nor does any lost motion result.

It is desirable that the disc 34 of sealing wheel 31 be adjustably mounted in the manner above described so that it can automatically adjust itself to line up with the wheel 41. In other words, the sealing elements 35 and 43 may not always be in perfect alignment with one another and by adjustably mounting the first sealing wheel 31 and maintaining the second sealing wheel 41 stationary, it is possible for the operator to move the sealing wheel 31 into alignment with the second wheel during sealing and by the use of the glass itself without causing the breakage thereof. It will be apparent that during sealing, there will be a time when the sheet is in operative relation with and being treated by both sealing wheels and it is therefore desirable that these wheels, during such time, be in substantial alignment with one another to prevent breakage of the glass. This is taken care of by adjustably mounting the sealing wheel 31 in the manner above described so that it is free to rock and also free to move bodily sidewise.

The present invention also contemplates the provision of means for preventing an excess of sealing material from being carried upwardly by the sealing elements 35 and 43. To this end, there are associated with the sealing wheels 31 and 41 the members 54 and 55 respectively, said members being provided with slots which are adapted to receive the sealing elements therein. The slots are wider than the sealing elements so that while they permit them to carry up the desired amount of sealing material, they will, at the same time, prevent them from carrying up an excess of material. This is desirable because it reduces to a minimum the tendency for the sealing material to be smeared upon the sides of the sheet. For the purpose of cleaning the edge of the laminated sheet after it has been sealed to remove therefrom any surplus sealing material, a scraping member 56 may be provided, said member being carried by a bracket 57 secured to the receptacle 25 and having its forward end upturned as at 58 to provide a scraping finger. With such an arrangement, after the sheet has been passed in one direction into operative relation with respect to the sealing wheels and properly sealed thereby, it can be passed in the opposite direction by the operator in what might be termed the return stroke over and into engagement with the scraping finger 58 which will function to scrape any surplus sealing material therefrom and thus clean the edge of the sheet. By providing sealing means at each side of the machine and operating them simultaneously and preferably from a single source of power, it is possible that a plurality of laminated sheets can be simultaneously sealed on the single machine, one operator being of course provided at each side thereof.

In Fig. 5 is illustrated a slightly modified arrangement embodying certain principles of the present invention. In this arrangement, there are provided the two sealing wheels 59 and 60 placed in horizontal alignment with one another and carried upon shafts 61 and 62 respectively. However, neither one of these sealing wheels is adjustably mounted but, on the other hand, both are stationary and rotatable about fixed axes. Both of the sealing wheels 59 and 60 may be of the same construction as wheel 41 above described. The sealing of the sheet is, however, accomplished in the same manner and the sealing wheels 59 and 60 serve the same purpose as the sealing wheels 31 and 41.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for sealing the edges of laminated sheet glass, including a pair of sealing wheels arranged in substantial horizontal alignment with one another, means for rotating said wheels simultaneously in the same direction, the sheet to be sealed being moved successively into operative relation with respect thereto, and means for adjustably mounting one of said wheels to allow for a rocking and bodily sidewise movement thereof.

2. Apparatus for sealing the edges of laminated sheet glass, including a pair of rotatable sealing wheels arranged in substantial horizontal alignment with one another, a receptacle containing a sealing material within which the lower portions of said wheels are immersed, the sheet to be sealed being moved successively into operative relation with respect to said wheels which, upon rotation, function to feed the sealed material into place, means for mounting one of said wheels to rotate about a substantially fixed axis, and means for adjustably mounting the other wheel to allow a universal rocking and bodily sidewise movement thereof with respect to the first wheel.

3. Apparatus for sealing the edges of laminated sheet glass, including a rotatable sealing element, and means for adjustably mounting said element to allow a universal rocking movement thereof.

4. Apparatus for sealing the edges of laminated sheet glass, including a rotatable sealing element, and means for adjustably mounting said element to allow both universal rocking and bodily sidewise movement thereof.

5. An apparatus for sealing the edges of laminated glass consisting of two sheets of glass and an interposed layer of plastic material which is of less area than the glass sheets whereby to provide a marginal seal-receiving channel, including a plurality of sealing elements mounted in substantial alignment and relatively close to one another, the sheet to be sealed being moved with respect to said elements in a manner that first one thereof will be received in the channel and upon continued movement, the second element will likewise be received in the channel while the first element is still arranged therein.

6. An apparatus for sealing the edges of laminated glass consisting of two sheets of glass and an interposed layer of plastic material which is of less area than the glass sheets whereby to provide a marginal seal-receiving channel, including a plurality of rotatable sealing elements mounted in substantial alignment and relatively close to one another, the sheet to be sealed being moved with respect to said elements in a manner that first one thereof will be received in the channel and upon continued movement, the second element will likewise be received in the channel while the first element is still arranged therein.

7. An apparatus for sealing the edges of laminated glass consisting of two sheets of glass and an interposed layer of plastic material which is of less area than the glass sheets whereby to provide a marginal seal-receiving channel, comprising a receptacle containing a quantity of sealing material, a pair of rotatable discs mounted in substantial alignment and relatively close to one another, said discs being adapted to be rotated so that portions thereof will move through the sealing material, the sheet to be sealed being moved with respect to the rotatable discs in a manner that first one thereof will be received in the channel and upon continued movement, the second disc will likewise be received in the channel while the first is still arranged therein.

8. An apparatus for sealing the edges of laminated glass consisting of two sheets of glass and an interposed layer of plastic material which is of less area than the glass sheets whereby to provide a marginal seal-receiving channel, comprising a receptacle adapted to contain a quantity of sealing material, a preliminary sealing device and a final sealing device arranged in substantial alignment and associated with the receptacle in a manner to receive the sealing material therefrom, the sheet to be sealed being moved successively into operative relation with first the preliminary sealing device and then into operative relation with respect to the final sealing device whereby to deposit the sealing material into the seal-receiving channel, the sealing devices being so arranged with respect to one another that the sheet to be sealed can be moved in operative relation with both of said sealing devices simultaneously.

9. An apparatus for sealing the edges of laminated glass consisting of two sheets of glass and an interposed layer of plastic material which is of less area than the glass sheets whereby to provide a marginal seal-receiving channel, comprising a receptacle adapted to contain a quantity of sealing material, a preliminary rotatable disc and a final rotatable disc arranged in substantial alignment and associated with the receptacle in a manner to receive the sealing material therefrom, the sheet to be sealed being moved successively into operative relation with first the preliminary rotatable disc and then into operative relation with respect to the final rotatable disc whereby to deposit the sealing material into the seal-receiving channel, the rotatable discs being so arranged with respect to one another that the sheet to be sealed can be moved into operative relation with both of said rotatable discs simultaneously.

10. An apparatus for sealing the edges of laminated glass consisting of two sheets of glass and an interposed layer of plastic material which is of less area than the glass sheets whereby to provide a marginal seal-receiving channel, comprising a receptacle adapted to contain a quantity of saling material, a preliminary rotatable disc and a final rotatable disc arranged in substantial alignment and associated with the receptacle in a manner to receive the sealing material therefrom, the sheet to be sealed being moved successively into operative relation with first the preliminary rotatable disc and then into operative relation with respect to the final rotatable disc whereby to deposit the sealing material into the seal-receiving channel, the rotatable discs being so arranged with respect to one another that the sheet to be sealed can be moved into operative relation with both of said rotatable discs simultaneously, and means associated with each rotatable disc for preventing an excessive amount of sealing material from being carried upwardly thereby.

11. The process of sealing the edges of laminated glass comprising two sheets of glass and an interposed layer of plastic material which is of less area than the glass sheets whereby to provide a marginal seal-receiving channel, consisting of the steps of passing the sheet forwardly in a definite predetermined path and in subjecting the sheet first to a preliminary sealing operation and then to a final sealing operation in a manner to completely fill the seal-receiving channel, both of said sealing operations being performed on the sheet simultaneously.

12. The process of sealing the edges of laminated glass comprising two sheets of glass and an interposed layer of plastic material which is of less area than the glass sheets whereby to provide a marginal seal-receiving channel, consisting of the steps of passing the sheet in proximity to a plurality of sealing devices adapted to be received within the seal-receiving channel whereby to deposit sealing material into said channel, said sealing devices being positioned to be received simultaneously within the seal-receiving channel.

13. The process of sealing the edges of laminated glass comprising two sheets of glass and an interposed layer of plastic material which is of less area than the glass sheets whereby to provide a marginal seal-receiving channel, consisting in simultaneously subjecting one portion of the sheet to a preliminary sealing operation and another portion of the same sheet to a final sealing operation in a manner to completely fill the said seal-receiving channel.

14. The process of sealing the edges of laminated glass comprising two sheets of glass and an interposed layer of plastic material which is of less area than the glass sheets whereby to provide a marginal seal-receiving channel, consisting in moving the sheet of glass in contact with a pair of rotating discs arranged to have their peripheries received within the seal-receiving channel simultaneously whereby to completely fill the said channel with the sealing material.

FRANK FRASER.